United States Patent
Morikita et al.

(10) Patent No.: US 10,373,758 B2
(45) Date of Patent: Aug. 6, 2019

(54) ELECTRICALLY INSULATING OIL COMPOSITION, AND OIL-IMPREGNATED ELECTRICAL EQUIPMENT

(71) Applicant: JXTG NIPPON OIL & ENERGY CORPORATION, Tokyo (JP)

(72) Inventors: Takashi Morikita, Tokyo (JP); Hiroyuki Hoshino, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 39 days.

(21) Appl. No.: 14/917,418

(22) PCT Filed: Sep. 5, 2014

(86) PCT No.: PCT/JP2014/073555
§ 371 (c)(1),
(2) Date: Mar. 8, 2016

(87) PCT Pub. No.: WO2015/037543
PCT Pub. Date: Mar. 19, 2015

(65) Prior Publication Data
US 2016/0225528 A1   Aug. 4, 2016

(30) Foreign Application Priority Data

Sep. 12, 2013  (JP) ................. 2013-189639

(51) Int. Cl.
  *H01B 3/22*  (2006.01)
  *H01G 4/22*  (2006.01)
  *H01G 4/18*  (2006.01)
  *H01B 3/20*  (2006.01)

(52) U.S. Cl.
  CPC .............. *H01G 4/221* (2013.01); *H01B 3/20* (2013.01); *H01B 3/22* (2013.01); *H01G 4/18* (2013.01)

(58) Field of Classification Search
  CPC ............ H01G 4/221; H01G 4/22; H01G 4/04; H01G 4/32; H01G 4/18; H01B 3/22
  See application file for complete search history.

(56) References Cited

U.S. PATENT DOCUMENTS 5,081,758 A * 1/1992 Sato .......................... H01B 3/22
                                              29/25.41
5,410,155 A * 4/1995 Thomson ................ G01T 1/203
                                              250/364
2002/0179890 A1 * 12/2002 Sletson ..................... H01B 3/22
                                              252/570
2003/0013902 A1 * 1/2003 Brand ..................... C07F 7/025
                                              556/472
2014/0110643 A1 * 4/2014 Kimura ................ C10M 105/06
                                              252/570

FOREIGN PATENT DOCUMENTS

| CN | 101903958 A | 12/2010 |
| CN | 104170022 A | 11/2014 |
| EP | 2827342 A | 1/2015 |
| JP | S57-050708 A | 3/1982 |
| JP | S62-180907 A | 8/1987 |
| JP | S63-064213 A | 3/1988 |
| JP | S63-064214 A | 3/1988 |
| JP | S63-064217 A | 3/1988 |
| JP | H1-228924 A | 9/1989 |
| JP | H5-028833 A | 2/1993 |
| JP | H8-008008 A | 1/1996 |
| JP | 2012-256449 A | 12/2012 |
| WO | 2012/169372 A1 | 12/2012 |
| WO | 2013/115372 A1 | 8/2013 |
| WO | 2013/137055 A1 | 9/2013 |

OTHER PUBLICATIONS

Chinese Office Action issued with respect to Application No. 201480050005.3, dated Sep. 23, 2016.
International Search Report issued with respect to application No. PCT/JP2014/073555, dated Nov. 11, 2014.
International Preliminary Report on Patentability issued with respect to application No. PCT/JP2014/073555, dated Mar. 24, 2016.
European Search Report in respect to European Application No. 14844144.7, dated Apr. 5, 2017.

* cited by examiner

*Primary Examiner* — Nguyen T Ha

(74) *Attorney, Agent, or Firm* — Greenblum & Bernstein, P.L.C.

(57) ABSTRACT

It is an object to provide an electrically insulating oil composition that can maintain dielectric breakdown voltage high in a wide temperature range of −50° C. to 65° C., and can suppress a decrease in dielectric breakdown voltage even in the case of use at high temperature for a long time, and there is provided an electrically insulating oil composition comprising 1,1-diphenylethane and benzyltoluene, wherein the proportion of a para isomer in the benzyltoluene is 45% by mass or more based on a total amount of the benzyltoluene.

6 Claims, No Drawings

ELECTRICALLY INSULATING OIL COMPOSITION, AND OIL-IMPREGNATED ELECTRICAL EQUIPMENT

TECHNICAL FIELD

The present invention relates to an electrically insulating oil composition and oil-impregnated electrical equipment.

BACKGROUND ART

Performance mainly required of electrically insulating oils such as capacitor oils include, the dielectric breakdown voltage being high, the hydrogen gas absorbency being high, the viscosity being low, and the melting point being low, and in addition the compatibility to various types of members such as packings and dielectric members constituting capacitor elements being good. In recent years, as various types of oil-filled electrical equipment (oil-impregnated electrical equipment), including capacitors, has been used all over the world, electrically insulating oils having higher dielectric breakdown voltage have been being used. With the development of the world economy, use in extremely low temperature areas where oil-impregnated electrical equipment has not been used so far is required of the oil-impregnated electrical equipment, and studies on electrically insulating oils excellent in low temperature characteristics that can adapt to the use are promoted. On the other hand, in the process of conventional capacitor performance improvement, a polypropylene film having a high dielectric constant is used as the dielectric between the electrodes instead of paper. In the insulating oil having high electrically insulating properties (high dielectric breakdown voltage) as described above, compounds constituting it are generally aromatic compounds, and therefore the insulating oil is a factor that swells the polypropylene film, and decreases the dielectric breakdown voltage of the capacitor due to the extension of defects in the film, an increase in the mechanical stress of the film in the capacitor strongly wound, and the like. This influence is significant particularly at high temperature, and in industrial equipment installed outdoors, electrical characteristics at high temperature are also important because of its use form.

As the electrically insulating oils having high dielectric breakdown voltage, mixtures of benzyltoluene and dibenzyltoluene have been used over a long time. Benzyltoluene has a high ratio of aromatic carbon in the molecule, has high hydrogen gas absorbency, and is excellent in withstand voltage characteristics, and therefore is widely used in electrically insulating oils.

In addition, in the following Patent Literature 1, electrically insulating oils composed of benzyltoluene and ditolylmethane are described, and it is found that the performance changes greatly depending on the blended substances and their blending proportion. In other words, there are rare cases where in electrically insulating oils, such performance as not considered in theory is obtained depending on the blended substances.

On the other hand, for 1-phenyl-1-xylylethane or 1-phenyl-1-ethylphenylethane, its production is easy, and it has excellent characteristics such as the dielectric breakdown voltage being relatively high, and the dielectric loss being small, and therefore it is widely used in electrically insulating oils. For example, as an electrically insulating oil composition for which in addition to the dielectric breakdown voltage being excellent and the dielectric loss being small, the oxidation stability is particularly excellent, a composition containing 1-phenyl-1-(2,4-dimethylphenyl) ethane or 1-phenyl-1-(2,5-dimethylphenyl)ethane is proposed (see the following Patent Literature 2).

CITATION LIST

Patent Literature

Patent Literature 1: Japanese Unexamined Patent Publication No. S63-64217
Patent Literature 2: Japanese Unexamined Patent Publication No. S57-50708

SUMMARY OF INVENTION

Technical Problem

By the way, recent research on electrically insulating oils using benzyltoluene has mainly assumed that crystal precipitation in a low temperature region is prevented, and the electrically insulating oils are provided to capacitors having excellent performance even in low temperature environments.

But, performance that industrial electrical equipment can be used even if the ambient temperature is about 50° C. is required of the industrial electrical equipment, which is often installed outdoors because of large size. In other words, the fact that high performance can be maintained over a long period even at a high temperature of 50° C. or more is required of electrical equipment such as capacitors, and electrically insulating oils used therein.

One of the causes of capacitor performance decrease at high temperature include swelling of a polypropylene film used as a dielectric between electrodes which is one of the most important members of a capacitor, caused by the electrically insulating oil.

Recent polypropylene films are films in which the number of insulation defects is small, but in order to more reliably prevent dielectric breakdown, a contrivance is made in which two films are inserted between electrodes so that the dielectric breakdown of the capacitor caused by insulation defects does not occur unless insulation defect portions overlap. However, in the polypropylene films, the volume expands by swelling, and therefore a decrease in density occurs, and such slight defects that cannot be said to be insulation defects during non-impregnation are extended to clear insulation defects by swelling, which may lead to dielectric breakdown. This problem occurs significantly as the time during which the capacitor is exposed to high temperature becomes longer.

Particularly in the element of an oil-impregnated capacitor, polypropylene films are sandwiched between aluminum electrodes and then wound, pressure is applied from the diameter direction of the winding to crush it, and it is placed in a case. Therefore, in the wound polypropylene films, the radius of curvature changes from the outer perimeter to the inner perimeter, and flat surface portions and curved surface portions occur also on the same perimeter, and particularly the curved surface portions are in a state in which some stress is applied even at the stage before oil impregnation. When the curved surface portions are impregnated with the electrically insulating oil, they are more influenced by swelling than the flat surface portions, and therefore the formation of defects is likely to occur in the curved surface portions, which may lead to dielectric breakdown.

Thus, in the selection of an oil for a capacitor using a polypropylene film, swelling properties for the polypropylene film should be studied, and an electrically insulating oil having lower swelling properties should be used. The development of this electrically insulating oil having low swelling properties leads to providing electrical equipment such as a capacitor having excellent performance in a high temperature environment.

The present invention has been made in view of the above problems that conventional art has, and it is an object of the present invention to provide an electrically insulating oil composition and oil-impregnated electrical equipment that can maintain dielectric breakdown voltage high in a wide temperature range of −50° C. to 65° C., and can suppress a decrease in dielectric breakdown voltage even in the case of use at high temperature for a long time.

Solution to Problem

In order to achieve the above object, the present invention provides an electrically insulating oil composition comprising 1,1-diphenylethane and benzyltoluene, wherein the proportion of a para isomer in the above benzyltoluene is 45% by mass or more based on a total amount of the above benzyltoluene.

In order to develop the electrically insulating oil composition of the present invention described above, the present inventors have researched diligently over and over, and the following study has been performed. In other words, when a study has been performed for the swelling properties of a polypropylene film for the isomers of benzyltoluene (hereinafter sometimes abbreviated as "BT"), it has been found that the examination of the swelling properties by experiment is difficult. Specifically, it has been found that it is difficult to accurately evaluate the swelling properties by the weight change of the film after oil impregnation, and the like, because the film thickness of the film is very thin (20 μm or less), and the removal of the excess oil adhering to the film surface is difficult, and the like. Therefore, in order to search for a theoretical guideline, a study has been performed, which has led to the application of Hansen solubility parameters. The distances between the solubility parameter values (SP values) of the isomers of benzyltoluene and polypropylene have been compared, and the distances between the SP values have been taken as indicators of the swelling properties for the polypropylene film. When the distances between the Hansen SP values of polypropylene and the isomers of benzyltoluene have been compared, they have been calculated as 5.61 for o-BT, 5.80 for m-BT, and 6.00 for p-BT. This is evaluation in which the following can be said: the larger the SP value distance is, the lower the compatibility is, but in this study, it has been interpreted as follows: the larger the SP value distance is, the lower the swelling properties are.

However, the performance of an electrically insulating oil composition at high temperature cannot always be evaluated by only the swelling properties and SP value distances for the isomers of benzyltoluene. On the other hand, not only swelling suppression at high temperature but also the maintenance of performance at low temperature is required of an electrically insulating oil composition, and therefore solidification prevention and viscosity reduction at low temperature utilizing freezing point depression have also been researched over and over. As a result, by using 1,1-diphenylethane and benzyltoluene in combination and setting the proportion of the para isomer (p-BT) in the benzyltoluene in a predetermined proportion or more, the characteristics at low temperature and high temperature described above have been balanced, and the electrically insulating oil composition of the present invention that can be used at low temperature and has durability at high temperature has been completed. According to the electrically insulating oil composition of the present invention, by having the above configuration, the dielectric breakdown voltage can be maintained high in a wide temperature range of −50° C. to 65° C., and a decrease in dielectric breakdown voltage can be suppressed even in the case of use at high temperature for a long time.

It is preferred that in the electrically insulating oil composition of the present invention, a total content of the above 1,1-diphenylethane and the above benzyltoluene is 80% by mass or more based on a total amount of the electrically insulating oil composition. Thus, the dielectric breakdown voltage can be maintained higher in a wide temperature range of −50° C. to 65° C., and a decrease in dielectric breakdown voltage can be further suppressed even in the case of use at high temperature for a long time.

It is preferred that the electrically insulating oil composition of the present invention further comprises 0.01 to 1.0% by mass of an epoxy compound based on the total amount of the electrically insulating oil composition. Thus, deterioration in performance due to a polar substance component such as chlorine in the electrically insulating oil composition can be suppressed. As a result, deterioration in the performance of the electrically insulating oil composition is suppressed, the dielectric breakdown voltage can be maintained higher in a wide temperature range of −50° C. to 65° C., and a decrease in dielectric breakdown voltage can be further suppressed even in the case of use at high temperature for a long time.

It is preferred that in the electrically insulating oil composition of the present invention, a chlorine component is 50 ppm by mass or less. Thus, deterioration in the performance of the electrically insulating oil composition is suppressed, the dielectric breakdown voltage can be maintained higher in a wide temperature range of −50° C. to 65° C., and a decrease in dielectric breakdown voltage can be further suppressed even in the case of use at high temperature for a long time.

The present invention also provides oil-impregnated electrical equipment impregnated with the electrically insulating oil composition of the present invention described above. In addition, it is preferred that the above oil-impregnated electrical equipment is an oil-impregnated capacitor using a polypropylene film at least in part as a dielectric. The oil-impregnated electrical equipment uses the electrically insulating oil composition of the present invention described above, and therefore the dielectric breakdown voltage can be maintained high in a wide temperature range of −50° C. to 65° C., and a decrease in dielectric breakdown voltage can be suppressed even in the case of use at high temperature for a long time.

Advantageous Effects of Invention

According to the present invention, it is possible to provide an electrically insulating oil composition and oil-impregnated electrical equipment that can maintain dielectric breakdown voltage high in a wide temperature range of −50° C. to 65° C., and can suppress a decrease in dielectric breakdown voltage even in the case of use at high temperature for a long time. The electrically insulating oil composition of the present invention is not only an electrically insulating oil composition that can be used at low temperature as described above, but also is an electrically insulating oil composition for which, for example, the influence on capacitor members at high temperature is small, and therefore degradation in capacitor performance at high temperature can be significantly suppressed. Thus, the electrically insulating oil composition of the present invention is an electrically insulating oil composition that is practically extremely excellent at the present time when the use of a polypropylene film as the dielectric of a capacitor is widespread.

DESCRIPTION OF EMBODIMENTS

The present invention will be described in detail below in accordance with preferred embodiments thereof.

An electrically insulating oil composition according to this embodiment comprises a diarylalkane mixture in which 1,1-diphenylethane and benzyltoluene are blended, and the proportion of the para isomer in the above benzyltoluene is 45% by mass or more based on the total amount of the benzyltoluene.

The methods for obtaining 1,1-diphenylethane and benzyltoluene are not particularly limited, and commercial products may be used, or 1,1-diphenylethane and benzyltoluene may be produced by oneself. For the benzyltoluene, the production method may be adjusted so that the proportion of the para isomer is in the above range, or isomers may be separately produced and mixed in the desired proportion.

The proportion of the para isomer in the benzyltoluene is 45% by mass or more based on the total amount of the benzyltoluene (the total amount of all isomers), and is preferably 50% by mass or more, more preferably 52% by mass or more, and further preferably 55% by mass or more from the viewpoint of still further suppressing a decrease in dielectric breakdown voltage in the case of use at high temperature for a long time. On the other hand, from the viewpoint of improving performance at low temperature and performance at high temperature in good balance, the proportion of the para isomer in the benzyltoluene is preferably 80% by mass or less, more preferably 75% by mass or less, and further preferably 70% by mass or less based on the total amount of the benzyltoluene.

The proportions of isomers other than the para isomer in the benzyltoluene are not particularly limited, but from the viewpoint of the suppression of a decrease in insulation performance due to crystallization and a decrease in fluidity (an increase in viscosity) at low temperature, the proportion of a meta isomer is preferably 5% by mass or more, more preferably 8% by mass or more, based on the total amount of the benzyltoluene.

The ratio (1,1-DPE/BT) of the 1,1-diphenylethane (1,1-DPE) to the benzyltoluene (BT) in the electrically insulating oil composition is not particularly limited but is preferably 0.50 or more, more preferably 0.55 or more, and further preferably 0.58 or more in terms of a mass ratio from the viewpoint of further improving performance at low temperature. In addition, the above ratio is preferably 2.5 or less, more preferably 2.2 or less, further preferably 2.0 or less, and particularly preferably 1.3 or less in terms of a mass ratio from the viewpoint of sufficiently increasing the concentration of p-BT in the electrically insulating oil composition and further improving dielectric breakdown voltage at high temperature In addition, the content of p-BT in the electrically insulating oil composition is not particularly limited but is preferably 13% by mass or more, more preferably 15% by mass or more, further preferably 18% by mass or more, and particularly preferably 20% by mass or more based on the total amount of the electrically insulating oil composition from the viewpoint of still further suppressing a decrease in dielectric breakdown voltage in the case of use at high temperature for a long time. On the other hand, from the viewpoint of improving performance at low temperature and performance at high temperature in good balance, the content of p-BT in the electrically insulating oil composition is preferably 50% by mass or less, more preferably 45% by mass or less, based on the total amount of the electrically insulating oil composition.

The electrically insulating oil composition can contain components other than 1,1-diphenylethane and benzyltoluene, but the total content of the 1,1-diphenylethane and the benzyltoluene is preferably 80% by mass or more, more preferably 90% by mass or more, and further preferably 95% by mass or more based on the total amount of the electrically insulating oil composition. By setting the total content of the 1,1-diphenylethane and the benzyltoluene in the above range, dielectric breakdown voltage in a wide temperature range can be maintained higher.

The electrically insulating oil composition may comprise other hydrocarbons such as bicyclic aromatic compounds such as alkylbenzenes having 12 to 18 carbon atoms, cycloalkylbenzenes, 1,2-diphenylethane, and diphenylmethane, and polycyclic aromatic compounds such as alkylnaphthalenes, in addition to 1,1-diphenylethane and benzyltoluene.

Benzyltoluene is usually produced by reacting benzyl chloride and toluene, and therefore a chlorine component is included in the electrically insulating oil composition. But, it is found that the chlorine component deteriorates the performance of the electrically insulating oil composition. Therefore, the chlorine component in the electrically insulating oil composition is preferably 50 ppm by mass or less, more preferably 30 ppm by mass or less, and further preferably 10 ppm by mass or less. By suppressing the content of the chlorine component in the above range, deterioration in the performance of the electrically insulating oil composition can be suppressed. In the electrically insulating oil composition, a polar substance that adversely affects the performance of the electrically insulating oil composition is removed by performing white clay treatment, but organochlorine components are difficult to remove by white clay treatment, and therefore it is desired to decrease chlorine concentration at the benzyltoluene production stage.

In the electrically insulating oil composition, the dielectric dissipation factor increases by containing a polar substance such as water, and the insulating properties decrease when the dielectric dissipation factor is high, and therefore the performance as the electrically insulating oil composition deteriorates. In order to avoid these, when the electrically insulating oil composition is brought into contact with activated clay to remove the polar substance such as water, the dielectric dissipation factor reduces, and the performance as the electrically insulating oil composition improves. The activated clay used at this time is not particularly limited. The shape of the activated clay is not particularly limited, but a molded body is preferred from a practical viewpoint. The chlorine component cannot always be removed with activated clay, and therefore preferably an epoxy compound is added as a chlorine-trapping agent (chlorine-capturing agent). This epoxy compound is removed to some extent by being brought into contact with activated clay, and therefore it is desired to add the epoxy compound after the electrically insulating oil composition is white clay-treated.

Examples of the epoxy compound include alicyclic epoxy compounds such as 3,4-epoxycyclohexylmethyl(3,4-epoxycyclohexane) carboxylate, vinylcyclohexene diepoxide, and 3,4-epoxy-6-methylcyclohexylmethyl(3,4-epoxy-6-methylhexane) carboxylate, and bisphenol A diglycidyl ether type epoxy compounds such as phenol novolac type epoxy compounds and ortho-cresol novolac type epoxy compounds. The amount of the epoxy compound added is preferably 0.01 to 1.0% by mass, more preferably 0.3 to 0.8% by mass, based on the total amount of the electrically insulating oil composition. When the amount added is less than 0.01% by mass, there is a tendency that the effect of trapping the chlorine component is not sufficiently exhibited, and when the amount added exceeds 1.0% by mass, there is a tendency that the electrical characteristics of the electrically insulating oil composition decrease, dielectric loss occurs inside a capacitor to generate heat and impair the performance of the capacitor.

The electrically insulating oil composition in this embodiment is preferably used in oil-impregnated electrical equipment and preferably used particularly for impregnating an oil-impregnated capacitor using a plastic film in at least part of an insulating material or a dielectric material.

As the plastic film, in addition to polyester films, polyvinylidene fluoride films, and the like, polyolefin films such as polypropylene films and polyethylene films, and the like can be used, and among them, polyolefin films are preferred. Particularly preferred polyolefin films are polypropylene films.

An oil-impregnated capacitor preferred in this embodiment is produced by winding metal foils such as aluminum as conductors and a plastic film as the above insulating material or dielectric material together with another material such as insulating paper as necessary, and impregnating the electrically insulating oil composition by a conventional method. Alternatively, the oil-impregnated capacitor is also produced by winding a metal-vapor-deposited plastic film (metallized film) in which metal layers as conductors such as aluminum or zinc are formed on a plastic film as the above insulating material or dielectric material by a method such as vapor deposition, together with a plastic film or insulating paper as necessary, and impregnating the electrically insulating oil composition by a conventional method.

EXAMPLES

The present invention will be more specifically described below by Examples, but the present invention is not limited to these Examples.

Example 1

As shown in Table 1, an electrically insulating oil composition comprising 35% by mass of 1,1-diphenylethane (1,1-DPE) and 60% by mass of benzyltoluene (BT) was prepared. Here, the 1,1-DPE was blended as a DPE fraction in which the effective component concentration (1,1-DPE concentration) was 85% by mass or more, and components other than the 1,1-DPE included in the DPE fraction are shown as other components in Table 1. In addition, the content of the other components shown in Table 1 is an amount also including 0.65% by mass of an epoxy compound described later. For the benzyltoluene, one in which benzyltoluene produced by replicating a reference production example described in Japanese Examined Patent Publication No. H8-8008 was precisely separated into isomers by distillation and then the isomer ratio was set at 3% by mass of the ortho form (o-BT), 51% by mass of the meta form (m-BT), and 46% by mass of the para form (p-BT) by the mixing of the fractions was used. In addition, bicyclic aromatic compounds such as diphenylmethane and 1,2-diphenylethane other than 1,1-diphenylethane and benzyltoluene, polycyclic aromatic compounds such as alkylnaphthalenes, alkylbenzenes having 12 to 18 carbon atoms, and cycloalkylbenzenes are included in the other components. The unit of a numerical value in Table 1 is ppm by mass for a chlorine component and % by mass for all of others.

Examples 2 to 12 and Comparative Examples 1 to 6

The electrically insulating oil compositions of Examples 2 to 12 and Comparative Examples 1 to 6 were prepared as in Example 1 except that the 1,1-DPE content, the BT content, the content of other components, and the BT isomer ratio were changed to values shown in Table 1. The BT isomer ratio was adjusted by changing the mixing proportion of the isomers of benzyltoluene produced as in Example 1.

Comparative Examples 7 and 8

The electrically insulating oil compositions of Comparative Examples 7 and 8 were prepared as in Example 1 except that instead of 1,1-DPE, phenylxylylethane (PXE) was used in an amount shown in Table 1, and the BT content, the content of other components, and the BT isomer ratio were changed to values shown in Table 1. The BT isomer ratio was adjusted by changing the mixing proportion of the isomers of benzyltoluene produced as in Example 1.

TABLE 1

| | Composition of electrically insulating oil composition | | | | | | Isomer ratio in BT | | |
|---|---|---|---|---|---|---|---|---|---|
| | 1,1-DPE | PXE | BT | Other components (including epoxy compound) | 1,1-DPE + BT | Chlorine component | o-BT | m-BT | p-BT |
| Example 1 | 35 | — | 60 | 5 | 95 | 1 or less | 3 | 51 | 46 |
| Example 2 | 44 | — | 50 | 6 | 94 | 1 or less | 3 | 51 | 46 |
| Example 3 | 52 | — | 40 | 8 | 92 | 1 or less | 3 | 51 | 46 |
| Example 4 | 66 | — | 30 | 4 | 96 | 1 or less | 3 | 51 | 46 |
| Example 5 | 35 | — | 60 | 5 | 95 | 31 | 42 | 6 | 52 |
| Example 6 | 44 | — | 50 | 6 | 94 | 26 | 42 | 6 | 52 |
| Example 7 | 52 | — | 40 | 8 | 92 | 21 | 42 | 6 | 52 |
| Example 8 | 66 | — | 30 | 4 | 96 | 16 | 42 | 6 | 52 |
| Example 9 | 35 | — | 60 | 5 | 95 | 8 | 12 | 19 | 69 |
| Example 10 | 44 | — | 50 | 6 | 94 | 7 | 12 | 19 | 69 |
| Example 11 | 52 | — | 40 | 8 | 92 | 6 | 12 | 19 | 69 |

TABLE 1-continued

|  | 1,1-DPE | PXE | BT | Composition of electrically insulating oil composition Other components (including epoxy compound) | 1,1-DPE + BT | Chlorine component | Isomer ratio in BT o-BT | m-BT | p-BT |
|---|---|---|---|---|---|---|---|---|---|
| Example 12 | 66 | — | 30 | 4 | 96 | 4 | 12 | 19 | 69 |
| Comparative Example 1 | 66 | — | 30 | 4 | 96 | 15 | 10 | 50 | 40 |
| Comparative Example 2 | 66 | — | 30 | 4 | 96 | 8 | 7 | 63 | 30 |
| Comparative Example 3 | 66 | — | 30 | 4 | 96 | 3 | 22 | 42 | 36 |
| Comparative Example 4 | 52 | — | 40 | 8 | 92 | 18 | 38 | 42 | 20 |
| Comparative Example 5 | 35 | — | 60 | 5 | 95 | 5 | 28 | 70 | 2 |
| Comparative Example 6 | 35 | — | 60 | 5 | 95 | 55 | 65 | 27 | 8 |
| Comparative Example 7 | — | 37 | 60 | 3 | 60 | 8 | 12 | 19 | 69 |
| Comparative Example 8 | — | 56 | 40 | 4 | 40 | 6 | 12 | 19 | 69 |

<Test A: Evaluation of Test Oil by Model Capacitor>

The capacitor used in the test was as follows. As the dielectric, one in which two inflation method polypropylene films manufactured by Shin-Etsu Film Co., Ltd. having a thickness of 12.7 μm (weight method) were stacked was used, and as the electrodes, aluminum foils were used. By winding and laminating these according to a conventional method, a model capacitor element for oil impregnation was fabricated.

This element has a capacitance of 0.2 to 0.3 μF. This element was placed in a can made of tinplate. The can was formed in a flexible structure so as to be able to adapt sufficiently when the insulator shrinks at low temperature. In addition, the ends of the electrodes were in a state of being slit as they were and not folded. As a method for making connections from the electrodes to a terminal, as in a method used for a high frequency capacitor, a structure was made in which winding is performed in a structure in which one ends of the electrodes are each protruded from the polypropylene films, and the protruded portions were spot-welded together to a lead wire.

The can type capacitor prepared in this manner was vacuum-dried according to a conventional method, and then impregnated with a test oil (the electrically insulating oil compositions of Examples 1 to 12 and Comparative Examples 1 to 8) and sealed under the same vacuum. In the impregnation, the test oil was used after being previously treated with activated clay. In other words, 10% by mass of activated white clay Galleonite #036 manufactured by Mizusawa Industrial Chemicals, Ltd. was added to the test oil (one before the addition of the following epoxy compound), and was stirred at a liquid temperature of 25° C. for 30 minutes and then filtered. After the filtration, an epoxy compound (alicyclic epoxy compound, trade name: CEL-LOXIDE 2021P, manufactured by Daicel Chemical Industries, Ltd.) as a chlorine-capturing agent was added so as to be 0.65% by mass based on the total amount of the electrically insulating oil composition, and the obtained electrically insulating oil composition was used for impregnation as the test oil.

Next, in order to make the impregnation condition inside the capacitor uniform for stabilization, heat treatment was performed in a thermostat at 80° C. for 2 days and nights. Then, the capacitor was allowed to stand at room temperature for 5 days, then voltage application treatment was performed at AC 1270 V (corresponding to 50 V/μm) in a thermostat at 30° C. for 16 hours, and then the capacitor was subjected to the test. This is referred to as preliminary voltage application.

Next, alternating voltage was applied to each of these oil-impregnated capacitors at predetermined temperatures by a predetermined voltage application method, and from the voltage and time at which the capacitor suffered dielectric breakdown, dielectric breakdown voltage was obtained by the following formula (1). The predetermined temperatures were −50° C. and 80° C. On the high temperature side, actually performance at 65° C. was required, but in this test, evaluation was performed at 80° C., which was a more severe condition. The predetermined voltage application method is a method of increasing the applied voltage stepwise from a potential gradient of 50 v/μm at the rate of 10 v/μm every 24 hours. The results are shown in Table 2.

Dielectric Breakdown Voltage (v/μm)=$V+S\times(T/1440)$  (1)

wherein V, S, and T represent applied voltage (v/μm) at the time of dielectric breakdown, increased voltage (v/μm) for every 24 hours, and elapsed time (minutes) until dielectric breakdown after applied voltage increase, respectively.

<Test B: Durability Test>

Those in which the same capacitors as the capacitors subjected to the test A were fabricated, and treatment until the preliminary voltage application was carried out were prepared. A potential gradient of 90% of the dielectric breakdown voltage at 80° C. obtained in the test A was applied to each of these model capacitors at 60° C. for 1000 hours. For one that suffered dielectric breakdown before 1000 hours was reached, the time is shown, and for one in which breakdown did not occur until 1000 hours, from the stage, a dielectric breakdown test similar to the test A was carried out at 80° C., and the performance evaluation of the capacitor after voltage application at 60° C. for a long time (durability test) was carried out. In addition, a performance decrease rate was obtained by the following formula (2). The results are shown in Table 2.

Performance Decrease Rate (%)={(80° C. dielectric breakdown voltage in the test A−80° C. dielectric breakdown voltage after 1000 hours in the test B)/80° C. dielectric breakdown voltage in the test A}×100  (2)

TABLE 2

|  | Test A (dielectric breakdown voltage) | | Test B: durability test | | |
|---|---|---|---|---|---|
|  | −50° C. (v/μm) | 80° C. (v/μm) | Endurance time (hour) | Dielectric breakdown voltage (v/μm) | Performance decrease rate (%) |
| Example 1 | 101 | 168 | 1000 | 159 | 5 |
| Example 2 | 100 | 150 | 1000 | 144 | 4 |
| Example 3 | 95 | 148 | 1000 | 140 | 5 |
| Example 4 | 82 | 139 | 1000 | 133 | 4 |

TABLE 2-continued

| | Test A (dielectric breakdown voltage) | | Test B: durability test | | |
|---|---|---|---|---|---|
| | −50° C. (v/μm) | 80° C. (v/μm) | Endurance time (hour) | Dielectric breakdown voltage (v/μm) | Performance decrease rate (%) |
| Example 5 | 95 | 168 | 1000 | 165 | 2 |
| Example 6 | 90 | 155 | 1000 | 150 | 3 |
| Example 7 | 87 | 154 | 1000 | 152 | 1 |
| Example 8 | 85 | 144 | 1000 | 141 | 2 |
| Example 9 | 99 | 173 | 1000 | 170 | 2 |
| Example 10 | 97 | 166 | 1000 | 163 | 2 |
| Example 11 | 96 | 159 | 1000 | 157 | 1 |
| Example 12 | 90 | 155 | 1000 | 152 | 2 |
| Comparative Example 1 | 92 | 158 | 1000 | 128 | 19 |
| Comparative Example 2 | 95 | 155 | 560 | — | — |
| Comparative Example 3 | 90 | 156 | 721 | — | — |
| Comparative Example 4 | 92 | 148 | 522 | — | — |
| Comparative Example 5 | 98 | 142 | 319 | — | — |
| Comparative Example 6 | 78 | 140 | 401 | — | — |
| Comparative Example 7 | 88 | 153 | 1000 | 125 | 18 |
| Comparative Example 8 | 81 | 147 | 753 | — | — |

As seen from the results shown in Table 2, in the Examples, good results were obtained in both the test A and the test B. Thus, it was confirmed that the electrically insulating oil compositions of the Examples were high performance electrically insulating oil compositions not only having high performance at low temperature but having high durability also in a high temperature region. On the other hand, in Comparative Examples 1 and 7, the performance decrease rate after 1000 hours was large in the test B, and in Comparative Examples 2 to 6 and 8, dielectric breakdown occurred within 1000 hours in the test B. In addition, when the polypropylene film exposed on the capacitor element surface was observed for the model capacitor after the test B was carried out, wrinkles on the film surface indicating the volume expansion of the polypropylene film were significant in Comparative Examples 1 to 8, and on the other hand, in Examples 1 to 12, their number and the extent of the wrinkles were small.

INDUSTRIAL APPLICABILITY

The electrically insulating oil composition of the present invention not only has necessary performance in a low temperature region, but has excellent electrical characteristics also in a high temperature region by suppressing the swelling properties of a polypropylene film, and is practically extremely useful as use for capacitor impregnation, and the like.

The invention claimed is:

1. An electrically insulating oil composition comprising:
   1,1-diphenylethane; and
   benzyltoluene,
   wherein the proportion of a para isomer in the benzyltoluene is 50% by mass or more based on a total amount of the benzyltoluene, such that a decrease in dielectric breakdown voltage of the electrically insulating oil composition is suppressed during its use between 50° C. and 80° C. for 1,000 hours or more.

2. The electrically insulating oil composition according to claim 1, wherein a total content of the 1,1-diphenylethane and the benzyltoluene is 80% by mass or more based on a total amount of the electrically insulating oil composition.

3. The electrically insulating oil composition according to claim 1, further comprising 0.01 to 1.0% by mass of an epoxy compound based on the total amount of the electrically insulating oil composition.

4. The electrically insulating oil composition according to claim 1, wherein a chlorine component is 50 ppm by mass or less.

5. Oil-impregnated electrical equipment impregnated with the electrically insulating oil composition according to claim 1.

6. The oil-impregnated electrical equipment according to claim 5, being an oil-impregnated capacitor using a polypropylene film at least in part as a dielectric.

* * * * *